3,840,484
Patented Oct. 8, 1974

3,840,484
STABILIZED POLYBUTADIENE RESIN
Delmar F. Lohr, Jr., and Edward Leo Kay, Akron, Ohio, assignors to The Firestone Tire & Rubber Company, Akron, Ohio
No Drawing. Filed Nov. 13, 1972, Ser. No. 306,068
Int. Cl. C08c 11/22; C08d 9/14
U.S. Cl. 260—23.7 M          27 Claims

ABSTRACT OF THE DISCLOSURE

The incorporation of a combination of a metal di(hydrocarbyl)phosphoro(di- or tetra-)thioate, a metal soap and thiazole into a polybutadiene resin greatly enhances the resistance thereof to thermo-oxidative deterioration.

FIELD OF THE INVENTION

This invention relates to butadiene polymers and copolymer resins, and more particularly to increasing the resistance of such resins to deterioration of the mechanical properties upon exposure to heat and air.

BACKGROUND OF THE INVENTION

Butadiene polymer and copolymer resins, particularly those having, in uncured state, a high proportion of butadiene units incorporated in 1,2-configuration, have come into considerable use, particularly as electrically insulating structural components, friction elements and the like. Particularly since these resins exhibit good mechanical properties, at least initially, at high temperatures, they are attractive candidates for applications in which they will be exposed to high temperatures. At temperatures above about 600° F. (316° C.), however, the mechanical properties of these resins tend to slowly degrade over a period of time, which excludes them from many applications for which they would otherwise be very suitable. To date, however, there does not appear to have been any successful development of enhanced heat-resistant resins of this type.

Accordingly, it is an object of this invention to increase the resistance of butadiene polyber and copolymer resins to deterioration by heat and air.

Another object is to provide such heat resistant resins which will have physical and chemical properties undiminished in comparison with these resins as heretofore supplied.

A further object is to improve the heat resistance of such resins by incorporating therein modest amounts of compounding ingredients which are inexpensive and readily available, and which present no dangers or inconvenience involving toxicity, corrosiveness or the like.

SUMMARY OF THE INVENTION

The above and other objects are secured, in accordance with this invention in compositions comprising:

| | Parts by weight |
|---|---|
| Polybutadiene resin | 100 |
| A metal di(hydrocarbyl)phospho (di- or tetra-) thioate | 0.5–5.0 |
| A metal soap | 0.5–5.0 |
| A thiazole | 0.5–5.0 |

The composition being cured by heating with presence of:

| | |
|---|---|
| A peroxide curing agent | 0.5–6.0 |

The above formula excludes other filling, reinforcing and compounding ingredients such as glass fiber, glass fabric, asbestos, flame resisters, and the like which may be used.

DESCRIPTION OF THE PREFERRED EMBODIMENTS

The polybutadiene resins

These may be any resins which are based on polymers of butadiene or copolymers of butadiene with up to 60%, based on the copolymers, of styrene. Also minor proportions, say up to 15% based on the copolymer of other ethylenically unsaturated compounds may be incorporated in the copolymers. These resins are usually prepared by (co)polymerizing the monomers by means of free radical or anionic catalysts to a relatively low molecular weight, say 1000–200,000, so that they are of at least a flowable consistence. These low molecular weight (co)polymers are then incorporated with any desired fillers, reinforcing fibers or fabrics, pigments, etc., peroxide or other curing agents if desired, etc., and the composite is cured under heat and pressure to produce the desired finished article.

More particularly, there have recently been developed a class of polybutadiene resins having at least 40%, and preferably at least 60% by weight, of butadiene in the polymer molecule, and having at least 80% by weight of the butadiene therein in the vinyl type of butadiene repeating unit structure. The average molecular weight (determined by intrinsic viscosity measurement) is at least 12,500 and the molecular weight distribution is such that at least 50%, and preferably 90%, of the polymer has a molecular weight above 10,000 and at least 95% has a molecular weight above 2,000. It has been found that the of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25° C. or about 0.68 taken at 30° C. The resin should also have a dilute solution viscosity of 0.2–0.7, preferably 0.3–0.6. The butadiene units are incorporated into the polymeric chain largely in the 1,2-configuration, preferably at least 80% of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO\cdot$, where R independently in each occurrence represents a hydrocarbon radical of 1–20 carbon atoms), and heating the polymers, usually under pressure. The curing temperature is advantageously at least 250° F. (121° C.), preferably about 300–350° F. (149–177° C.). Generally, no advantage in the process or product is obtained by exceeding a temperature of 420° F. (216° C.). Obviously, the higher the temperature the shorter will be the curing time required. Generally at 350° F. (177° C.) a satisfactory cure is obtained in less than four minutes, and in some cases even within a few seconds. Cure times of more than four minutes usually provide no added advantage. Where fast cures are desired it is necessary to use a filler to avoid crazing or cracking. A filler, such as silica, is advantageously used in the proportion of 25–65, preferably 40–60, volume percent based on the combined resin-filler composition. Also the resins may be incorporated with glass fiber, either as chopped filler or else as glass fabric in a laminate, in which case the glass fiber will serve the purpose of a filler in preventing crazing and cracking on fast cures.

More particularly with regard to the inclusion of fillers, the present invention is of particular advantage in the stabilization of compositions containing silica fillers in amounts of 150 to 500 parts by weight per 100 parts by weight of butadiene polymer or copolymer. In such cases it is desirable to include 0.5 to 2.0 parts per 100 parts of silica of an agent for bonding the filler to the polybutadiene resin such as an unsaturated-group-containing silane on the order of vinyl triacetoxysilane vinyl tributoxy silane, vinyl trimethoxysilane, and vinyl triethoxysilane.

The metal soap

This may be any metal salt and preferably a Group II–A or II–B metal salt (see "Handbook of Chemistry and Physics," 43rd ed., The Chemical Rubber Publishing Co., 1961, pages 448 and 449) of a higher fatty acid containing from 8 to 26 carbon atoms such as calcium 2-ethylhexanoate, calcium octoate, calcium laurate, calcium myristate, calcium stearate, calcium palmitate, calcium oleate, calcium arachidate, calcium abietate, magnesium stearate, magnesium octoate, magnesium oleate, zinc stearate, zinc oleate, zinc laurate, zinc abietate, cadmium stearate, and the like, and mixtures of any two or more of such salts in any proportions.

The metal di(hydrocarbyl)phosphoro (di- or tetra-) thioates

These may be any compounds of the formula (I) 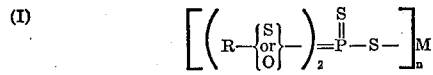

where

R, independently in each occurrence, is a hydrocarbyl radical containing 1–25 carbon atoms M is a polyvalent metal, preferably zinc or cadmium $n=$ the valence of the metal M

indicates either oxygen (in the case of dithioates) or sulfur (in the case of tetrathioates) bridging R and P and the remainder of the formula follows conventional chemical notation.

Examples of hydrocarbyl radicals which may occupy the situation indicated at R in Formula I are simple aliphatic hydrocarbon radicals such as ethyl, n-propyl, isopropyl, n-butyl, isobutyl, t-butyl, 2-ethylhexyl, n-dodecyl, the mixed radicals derived from petroleum fractions or the reduction of natural fatty glycerides such as coconut oil or tallow, cycloaliphatic radicals such as cyclohexyl, methylcyclohexyl, the reduction products of naval stores, aromatic radicals such as phenyl, o-, p- and m-toluyl, naphthyl and aralkyl radicals such as benzyl, phenylethyl and the like. Metals which form the component M in Formula I may be any di- or trivalent metals, particularly those of Group II-B and Groups VIII of the Periodic Chart of the Elements (Handbook of Chemistry and Physics, 43rd ed., The Chemical Rubber Publishing Co., 1961, pages 448 and 449), and particularly zinc, cadmium, copper, manganese, cobalt, iron and nickel. Specific suitable compounds include, for instance, zinc diisopropylphosphorodithioate, cadmium diisopropylphosphorodithioate, zinc di-(sec-butyl)phosphorodithioate, zinc diisobutylphosphorodithioate, cadmium diisobutylphosphorodithioate, zinc di-(cyclohexyl)phosphorodithioate, cadmium di(o-toluyl) phosphorodithioate, zinc dibenzylphosphorodithioate, zinc di(2-ethylhexyl)phosphorotetrathioate, zinc di(1,3-dimethylbutyl)phosphorodithioate, $Cu^{II}$ (1,3 - dimethylbutyl) phosphorodithioate, $Mn^{II}$ (1,3-dimethylbutyl)phosphorodithioate, $Co^{II}$ (1,3 - dimethylbutyl)phosphorodithioate, $Fe^{III}$ (1,3-dimethylbutyl)phosphorodithioate, $Ni^{II}$ (1,3-dimethylbutyl)phosphorodithioate, and the like.

The thiazole

This may be any compound containing the thiazole ring

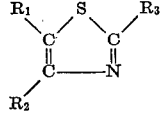

where the $R_1$, $R_2$ and $R_3$ independently in each occurrence represent hydrogen or attachments to organic radicals, the entire compound containing from 3 to 40 carbon atoms, inclusive of the carbon atoms in the thiazole ring. It has been discovered that benzothiazole derivatives are particularly effective and are the preferred compounds. Exemplary thiazoles are 2-mercaptobenzothiazole and metal salts of 2-mercaptobenzothiazole such as Zn, Cd, Ni, Cu, Mn, Co, Fe, etc., 2,2'-dithiobis(benzothiazole) as well as N-substituted-hydrocarbyl - 2 - benzothiazole sulfenamides where the hydrocarbyl radical may be simple aliphatic hydrocarbon radicals such as methyl, ethyl, n-propyl, isopropyl, n-butyl, isobutyl, t-butyl, etc., cycloaliphatic radicals such as cyclopentyl, cyclohexyl, methylcyclohexyl, etc., aromatic radicals such as phenyl, o-, m-, p-tolyl, etc., and aralkyl radicals such as benzyl, phenylethyl and the like, N,N'-disubstituted-hydrocarbyl-2-benzothiazolesulfenamides should also be effective in which the hydrocarbyl radicals are defined herein. Sulfenamides prepared with compounds in which the amine function is in a hydrocarbyl ring should also be effective. For example, 2-(morpholinothio)benzothiazole, 2-(piperidinothio)benzothiazole, 2 - (pyrrolindinothio)benzothiazole, etc.

The cured resins

The cured resins produced in accordance with this invention have exceptional resistance to deterioration of physical properties, particularly modulus and flexural strength, upon long time exposure at high temperatures, i.e., temperatures above 400° F. and up to 700° F. Thus, the products, upon exposure to temperatures of 400° F. for 1000 hours, or 600° F. for 100 hours, will retain upwards of 80% of their modulus and upwards of 60% of their flexural strength. The resins are therefore applicable in many situations where heat exposure is a factor, as in structural electrical components, cooking utensil handles, and automobile engine compartment components.

With the foregoing general discussion in mind, there are given herewith detailed experimental examples of the practice of this invention. All parts and percentages given are on the basis of weight, unless otherwise explicitly stated.

EXAMPLE I

| | Parts by weight |
|---|---|
| Polybutadiene [1] | 100 |
| Silica | 380 |
| Vinyl triacetoxysilane | 3 |
| Dicumyl peroxide | 3 |
| Hexane | 150 |
| Metal soap | [2] 0.0–3.10 |
| Metal di(hydrocarbyl)phosphoro(di- or tetra) thioate (Nature per Table I) | [2] 0–5.0 |
| Thiazole (Nature per Table I) | [2] 0–2.0 |

[1] 90% of butadiene units in 1,2-configuration; molecular weight parameters Mw=29,000 Mn=23,000 DSV=0.3.
[2] Per Table I.

A series of compositions was made up in accordance with the above schedule, varying the metal soap, phosphoro-(di- or tetra-)thioate and thiazole in the several compositions as indicated in Table I. In the case of each composition, all of the ingredients, in the proportions selected for that composition, were thoroughly mixed together, and the mixture poured into an evaporating dish to the depth of about 0.5 inch. The dish was then placed in a vacuum oven, where the hexane was removed at 125° F. under a pressure of 1–5 mm. of mercury absolute. Each such dried composition was then removed and broken up, and molded in a compression mold into several test bars 1" x 3" x 0.1". Alternatively, the resin can be heated to a melt and blended with the other ingredients of the composition without the use of a solvent. Temperature of molding was 350° F., total load on the die was 10–20 tons normal to the 1" x 3" face, and time was four minutes. The modulus and flexural strength was determined upon control bars from each composition, and the average recorded in Table I with the notation "unexposed" to indicate that these bars were not exposed to heat degradation. Other bars of each composition were exposed in an air oven at 600° F. for 100 hours, and the modulus and flexural strength determined and also recorded in Table I, with the notation "exposed." Set forth in Table I are the results.

Runs 1 through 4 are included as a frame of reference. As shown, the maximum percent retention of flexural modulus and strength is 29% and 33%, respectively. The inclusion of 1.00 part of Zn di-n-octylphosphorotetrathioate in the formulation increases the flexural modulus and strength retentions to 96% and 85%, respectively (runs Nos. 5 and 6). The additional inclusion of 0.50 part of Zn 2-mercaptobenzothiazole actually increased the flexural modulus and strength values obtained after aging 100 hours at 600° F. over that of the unaged samples (runs Nos. 7 and 8). This is an unexpected result and demonstrates the utility of our invention.

The beneficial effect of Zn 2-mercaptobenzothiazole is also shown by the data for runs Nos. 11 through 16. Both flexural modulus and strength are improved by the thiazole.

Addition of 0.50 part of Zn 2-(morpholinothio) benzothiazole to a composition containing 1.0–2.0 parts of Zn di-n-octylphosphorotetrathioate improves the exposed flexural modulus and flexural strength (runs 17–20).

A similar effect is shown with Zn 2-mercaptobenzothiazole (runs 23–26).

It should be noted that in runs Nos. 21 through 34, Zn stearate is used in place of Ca stearate.

Comparison of the data recorded in runs 21 through 24 again indicates the beneficial effects of Zn 2-mercaptobenzothiazole in combination with a phosphorotetrathioate. As shown by runs Nos. 25 and 26, the presence of 0.50 part of Zn 2-mercaptobenzothiazole does increase modulus and flexural strength retentions of test specimens containing a relatively high level of Zn di-n-octylphosphorotetrathioate.

Runs Nos. 27 through 32 show that 2-(morpholinothio) benzothiazole has essentially the same beneficial effect as Zn 2-mercaptobenzothiazole on modulus and flexural strength retention after aging. Data presented on runs Nos. 33 and 34 indicate that the optimum level of 2-(morpholinothio) benzothiazole in conjunction with 2.00 parts of Zn O,O'-dicyclohexylphosphorodithioate is probably less than 1.5 parts.

It is obvious that many combinations of di(hydrocarbyl) phosphoro(di- or tetra-)thioates and thiazoles can be used to effect retention of physical properties of resins as herein defined without departing from the intent of this invention.

TABLE I

| Metal soap | | Phosphoro(di-or tetra-)thioate | | Thiazole | | Heat and air exposure | Flexural modulus | | Flexural strength | | Run No. |
|---|---|---|---|---|---|---|---|---|---|---|---|
| Type | Parts used | Type | Parts | Type | Parts | | p.s.i. ×10⁻⁴ | Percent retention | p.s.i. | Percent retention | |
| None | | None | | None | | Unexposed | 1.31 | | 11,100 | | 1 |
| | | | | | | Exposed | 0.12 | 9 | 1,100 | 10 | 2 |
| | | None | | None | | Unexposed | 1.37 | | 10,400 | | 3 |
| | | | | | | Exposed | 0.40 | 29 | 3,400 | 33 | 4 |
| | | Zn di-n-octylphosphorotetrathioate | 1.00 | None | | Unexposed | 1.28 | | 10,100 | | 5 |
| | | | | | | Exposed | 1.23 | 96 | 8,600 | 85 | 6 |
| | | | | Zn 2-mercaptobenzothiazole | 0.50 | Unexposed | 1.42 | | 10,400 | | 7 |
| | | | | | | Exposed | 1.54 | 108 | 11,100 | 107 | 8 |
| Calcium stearate | 1.00 | | | None | | Unexposed | 1.35 | | 11,600 | | 9 |
| | | | | | | Exposed | 1.33 | 99 | 11,100 | 96 | 10 |
| | | Zn O,O'-dicyclohexylphosphoro dithioate | 2.00 | None | | Unexposed | 1.31 | | 11,300 | | 11 |
| | | | | | | Exposed | 1.19 | 91 | 9,100 | 80 | 12 |
| | | | | Zn 2-mercaptobenzothiazole | 0.50 | Unexposed | 1.32 | | 12,200 | | 13 |
| | | | | | | Exposed | 1.40 | 106 | 10,800 | 89 | 14 |
| | | | | None | | Unexposed | 1.41 | | 12,300 | | 15 |
| | | | | | | Exposed | 1.47 | 104 | 10,300 | 85 | 16 |
| | | | | 2-(morpholinothio) benzothiazole | 0.50 | Unexposed | 1.47 | | 11,300 | | 17 |
| | | | | | | Exposed | 1.55 | 105 | 10,900 | 97 | 18 |
| | | | | | | Unexposed | 1.44 | | 11,900 | | 19 |
| | | | | | | Exposed | 1.64 | 114 | 11,500 | 97 | 20 |
| | | Zn di-n-octylphosphorotetrathioate | 1.00 | Zn 2-mercaptobenzothiazole | 0.50 | Unexposed | 1.43 | | 11,300 | | 21 |
| | | | | | | Exposed | 1.44 | 101 | 9,900 | 88 | 22 |
| | | | | None | | Unexposed | 1.57 | | 11,000 | | 23 |
| Zinc stearate | 3.10 | | | | | Exposed | 1.38 | 88 | 9,700 | 88 | 24 |
| | | | | Zn 2-mercaptobenzothiazole | 2.00 | Unexposed | 1.38 | | 11,900 | | 25 |
| | | | | | | Exposed | 1.62 | 117 | 11,100 | 93 | 26 |
| | | | | Zn 2-mercaptobenzothiazole | 1.00 | Unexposed | 1.22 | | 10,100 | | 27 |
| | | | | | | Exposed | 1.39 | 114 | 10,000 | 99 | 28 |
| | | | | Zn 2-mercaptobenzothiazole | 0.50 | Unexposed | 1.21 | | 10,100 | | 29 |
| | | | | | | Exposed | 1.46 | 121 | 10,700 | 106 | 30 |
| | | Zn O,O'-dicyclohexylphosphorodithioate | 2.00 | 2-(morpholinothio) benzothiazole | 0.50 | Unexposed | 1.37 | | 11,100 | | 31 |
| | | | | | | Exposed | 1.63 | 119 | 11,300 | 102 | 32 |
| | | | | | 1.50 | Unexposed | 1.37 | | 11,300 | | 33 |
| | | | | | | Exposed | 1.60 | 117 | 10,900 | 97 | 34 |

What is claimed is:
1. Process of producing a resin composition having a high resistance to deterioration of its mechanical properties upon prolonged exposure to heat, which comprises subjecting to curing temperatures a composition containing

| | Parts by weight |
|---|---|
| A butadiene polymer or copolymer resin | 100 |
| A metal di(hydrocarbyl)phosphoro (di- or tetra-)thioate | 0.5–5.0 |
| A metal soap | 0.5–5.0 |
| A thiazole | 0.25–4.0 |
| A peroxide curing agent | 0.5–6.0 | the resin being a homopolymer of butadiene or a copolymer of butadiene and styrene having at least 40% of butadiene in the molecule and at least 80% of the butadiene repeating units in the resin being of the vinyl type of butadiene; the metal soap being the soap of abietic or a fatty acid containing from 8 to 26 carbon atoms; the peroxide being one which gives radicals of the structure $R_2(CH_2)CO\cdot$; and the thiazole having the formula

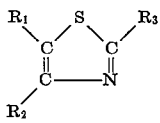

in which $R_1$, $R_2$ and $R_3$ represent hydrogen or organic radicals which may contain metal cations, the entire thiazole compound containing 3 to 40 carbon atoms, inclusive of the carbon atoms in the thiazole ring.

2. Process according to claim 1, wherein the composition further contains, by weight

| | |
|---|---|
| A silica filler | 150–500 (per 100 parts of resin). |
| A silane bonding agent | 0.5–2.0 (per 100 parts of silica filler). |

3. Process according to claim 1, wherein the metal soap is calcium stearate.
4. Process according to claim 1 wherein the thiazole is zinc 2-(mercapto)benzothiazole.
5. Process according to claim 1 wherein the thiazole is 2-(morpholinothio)mercaptobenzothiazole.
6. Process according to claim 1, wherein the peroxide curing agent is dicumyl peroxide.
7. Process according to claim 1, wherein proportions of metal di(hydrocarbyl)phosphoro(di- or tetra-)thioate, metal soap and thiazole are more particularly

| | Parts by weight |
|---|---|
| Metal di(hydrocarbyl)phosphoro (di- or tetra-)thioate | 1.0–3.0 |
| Metal soap | 2.0–4.0 |
| Thiazole | 0.50–2.5 |

8. Process according to claim 7, wherein the peroxide curing agent is dicumyl peroxide.
9. Process according to claim 1, wherein the metal component of the metal di(hydrocarbyl)phosphoro (di- or tetra-)thioate is zinc.
10. A composition curable to a hard resin composition having enhanced resistance to deterioration of its mechanical properties by exposure to heat and air comprising

| | Parts by weight |
|---|---|
| A butadiene polymer or copolymer resin | 100 |
| A metal di(hydrocarbyl)phosphoro (di- or tetra-)thioate | 0.5–5.0 |
| A metal soap | 0.5–5.0 |
| A thiazole | 0.25–4.0 |
| A peroxide curing agent | 0.5–6.0 | the resin being a homopolymer of butadiene or a copolymer of butadiene and styrene having at least 40% of butadiene in the molecule and at least 80% of the butadiene repeating units in the resin being of the vinyl type of butadiene; the metal soap being the soap of abietic or a fatty acid containing from 8 to 26 carbon atoms; the peroxide being one which gives radicals of the structure $R_2(CH_2)CO\cdot$; and the thiazole having the formula

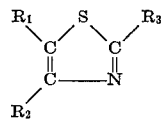

in which $R_1$, $R_2$ and $R_3$ represent hydrogen or organic radicals which may contain metal cations, the entire thiazole compound containing 3 to 40 carbon atoms, inclusive of the carbon atoms in the thiazole ring.

11. A composition according to claim 10 which further contains, by weight

| | |
|---|---|
| A silica filler | 150 parts (per 100 parts of resin). |
| A silane bonding agent | 0.5–200 parts (per 100 parts of silica filler). |

12. Composition according to claim 10, wherein the metal soap is calcium stearate.
13. Composition according to claim 10, wherein the peroxide is dicumyl peroxide.
14. Composition according to claim 10, wherein the thiazole is zinc 2-(mercapto)benzothiazole.
15. Composition according to claim 10, wherein the thiazole is 2-(morpholinothio)benzothiazole.
16. Composition according to claim 10, wherein the proportions of metal di(hydrocarbyl)phosphoro (di- or tetra-)thioate, metal soap and thiazole are more particularly

| | Parts by weight |
|---|---|
| Metal di(hydrocarbyl)phosphoro (di- or tetra-)thioate | 1.0–3.0 |
| Metal soap | 2.0–4.0 |
| Thiazole | 0.5–2.5 |

17. Composition according to claim 16, wherein the peroxide is dicumyl peroxide.
18. Composition according to claim 10, wherein the metal component of the metal di(hydrocarbyl)phosphoro-(di- or tetra-)thioate is zinc.
19. A peroxide-cured resin composition highly resistant to deterioration of physical properties upon exposure to heat, said resin containing therein

| | Parts by weight |
|---|---|
| A butadiene polymer or copolymer resin | 100 |
| A metal di(hydrocarbyl)phosphoro (di- or tetra-)thioate | 0.5–5.0 |
| A metal soap | 0.5–5.0 |
| A thiazole | 0.25–4.0 | the resin being a homopolymer of butadiene or a copolymer of butadiene and styrene having at least 40% of butadiene in the molecule and at least 80% of the butadiene repeating units in the resin being of the vinyl type of butadiene; the metal soap being the soap of abietic acid or a fatty acid containing from 8 to 26 carbon atoms; having the formula

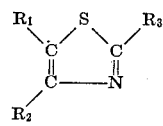

in which $R_1$, $R_2$ and $R_3$ represent hydrogen or organic radicals which may contain metal cations, the entire thiazole compound containing 3 to 40 carbon atoms, inclusive of the carbon atoms in the thiazole ring.

20. Cured resin according to claim 19 which further contains, by weight

| | |
|---|---|
| A silica filler | 150–500 parts (per 100 parts of resin). |
| A silane bonding agent | 0.5–2.0 parts (per 100 parts of silica filler). |

21. Cured resin according to claim 19, wherein the metal soap is calcium stearate.

22. Cured resin according to claim 19 wherein the peroxide is dicumyl peroxide.

23. Cured resin according to claim 19 wherein the thiazole is 2-(mercapto)benzothiazole.

24. Cured resin according to claim 19, wherein the thiazole is zinc 2-(morpholinothio)benzothiazole.

25. Cured resin according to claim 19, wherein the proportions of metal di(hydrocarbyl)phosphoro(di- or tetra-)thioate, metal soap and thiazole are more particularly

| | Parts by weight |
|---|---|
| Metal di(hydrocarbyl)phosphoro (di- or tetra-) thioate | 1.0–3.0 |
| Metal soap | 1.0–3.0 |
| Thiazole | 0.5–2.5 |

26. Cured resin according to claim 25, wherein the peroxide is dicumyl peroxide.

27. Cured resin according to claim 19, wherein the metal component of the di(hydrocarbyl)phosphoro(di- or tetra-)thioate is zinc.

References Cited
UNITED STATES PATENTS

| | | | |
|---|---|---|---|
| 3,494,900 | 2/1970 | Morita | 260—23.7 M |
| 3,196,134 | 7/1965 | Donat | 260—87.1 |
| 3,511,795 | 5/1970 | Brodie | 260—23.7 |
| 3,408,253 | 10/1968 | Eckert | 161—253 |
| 3,156,666 | 11/1964 | Pruett | 260—41 A |
| 2,906,731 | 9/1959 | Hill et al. | 260—45.7 PS |
| 3,317,446 | 5/1967 | Wilder | 260—27 BB |

DONALD E. CZAJA, Primary Examiner

W. E. PARKER, Assistant Examiner

U.S. Cl. X.R.

260—27 BB, 41 A, 45.7 PS

UNITED STATES PATENT OFFICE
CERTIFICATE OF CORRECTION

Patent No. 3,840,484           Dated October 8, 1974

Inventor(s) Delmar F. Lohr, Jr. and Edward Leo Kay

It is certified that error appears in the above-identified patent and that said Letters Patent are hereby corrected as shown below:

In Column 1, Line 42, "polyber" should be -- polymer --.

In Column 6, Table 1, under Thiazole Line 8, "None-L" should be -- none --.

In Column 9, Claim 24, Line 2, "zinc" should be removed.

Signed and sealed this 11th day of February 1975.

(SEAL)
Attest:

RUTH C. MASON
Attesting Officer

C. MARSHALL DANN
Commissioner of Patents
and Trademarks